United States Patent [19]

Stahler

[11] Patent Number: 4,516,151
[45] Date of Patent: May 7, 1985

[54] COLOR SLOW SCAN VIDEO SIGNAL TRANSLATION

[75] Inventor: John P. Stahler, San Diego, Calif.

[73] Assignee: Robot Research, Inc., San Diego, Calif.

[21] Appl. No.: 383,111

[22] Filed: May 28, 1982

[51] Int. Cl.³ ............................................. H04N 9/40
[52] U.S. Cl. ...................................... 358/14; 358/85; 358/12; 358/23
[58] Field of Search ...................... 358/11, 12, 14, 85, 358/23, 310

[56] References Cited

U.S. PATENT DOCUMENTS 3,162,838 12/1964 Sauvanet .............................. 358/18
4,057,836 11/1977 Munsey .............................. 358/140

OTHER PUBLICATIONS

Patchett, Colour Television with Particular Reference to the PAL System, 1968, pp. 131–139.
Steber, "SSTV to Fast-Scan Converter", QST, Mar. 1975, pp. 33–40.
Steber, "Slow-Scan to Fast-Scan TV Converter", QST, May 1975, pp. 28–36, 46.
Royle, "SSTV in Colour", QST, Nov. 1980, pp. 11–14.
Ingram, The Complete Handbook of Slow-Scan TV, TAB Books, 1977, pp. 173–189.

Primary Examiner—Michael A. Masinick
Attorney, Agent, or Firm—Baker, Maxham, Callan & Jester

[57] ABSTRACT

A method and system for translating between three complementary color component slow scan video signals and a composite color slow scan video signal containing a frequency modulated (FM) luminance information signal within a first frequency range of the slow scan video signal frequency band and an FM chrominance information signal within a separate second frequency range of the slow scan video signal frequency band, wherein the chrominance information signal includes a first color difference signal derived by subtracting the luminance information signal from one of three complementary color slow scan video signals and a second color difference signal derived by subtracting the luminance information signal from another of three complementary color slow scan video signals. The three complementary color component slow scan video signals are translated into the composite color slow scan video signal for transmission. Upon reception, the composite signal is translated into the three complementary signals for provision to a three memory slow-to-fast scan converter.

12 Claims, 4 Drawing Figures

COLOR SLOW SCAN VIDEO SIGNAL TRANSLATION

BACKGROUND OF THE INVENTION

The present invention generally pertains to slow scan television systems and is particularly directed to systems for translating color slow scan video signals.

Slow scan television systems utilize slow raster scan techniques in order to enable video signal image information to be transmitted over narrow bandwidth audio communication channels, such as the telephone lines. Such systems are described in two articles by Steber entitled "SSTV to Fast Scan Converter" appearing in the March 1975 issue of QST at pages 33-40, and "Slow-Scan to Fast-Scan TV Converter" appearing in the May 1975 issue of QST at pages 28-36 and 46. A slow scan television scan converter is described in U.S. Pat. No. 4,057,836 to Munsey. In Munsey's system, either fast scan video signals from standard closed-circuit television cameras or received slow scan video signals are stored a frame at a time in a digital memory. The stored slow scan video signal then is read out of the memory and transmitted at a slow scan video signal transmission rate over a narrow frequency band, using well known frequency modulation techniques. One complete frame can be transmitted on the order of every 8 to 32 seconds depending on the desired quality of the received image. The received slow scan video signal is then stored in the memory of the receiver system, from which it is read out at a fast scan rate for generating a display on a standard closed circuit television monitor.

Due to the restrictions placed on the transmission of slow scan video signals by the narrow bandwidth of the transmission channel, only a few techniques have been employed for the transmission of a full color slow scan video signal that includes three complementary color component slow scan video signals. One such technique is the transmission of sequential frames of red, green and blue component signals and storing each frame in a separate slow-to-fast scan converter and reading out all three signals simultaneously at the fast scan rate for generating a display on a color closed-circuit television monitor. The major drawback of this technique is the amount of transmission time required to send and receive the three complementary color component slow scan video signals necessary for generating a display of one composite color image. The transmission time is three times as long as for monochrome slow scan video signal transmission or about 24 to 96 seconds depending on the desired received image resolution. An additional drawback of this technique is that the composite three color image is not available for viewing until reception of the last of the three complementary color component signals.

Another prior art technique is the interleaving of the red, green and blue component signals in a line interlace fashion, resulting in a system that still takes three times longer than its monochrome counterpart but which allows the viewer to inspect the image as a complete color entity as it is received.

Still another prior art technique is to transmit a frame of luminance information at the monochrome slow scan video signal transmission rate followed by the transmission of two color difference information frames at twice the monochrome rate, but at a lower level of resolution. The lines of video information are interlaced to give the appearance of a continuous color transmission. This technique still takes twice as long as the transmission of a monochrome slow scan video signal.

A technique that would result in the complete transmission of a color slow scan video signal in a time equivalent to that required for transmission of monochrome slow scan video signal has been suggested. According to this technique, an amplitude modulated chrominance information subcarrier in a frequency band below the band used for frequency modulating the luminance information signal is quadrature modulated with two color difference information signals. One problem with this technique is that the chrominance information subcarrier would necessarily be less immune to noise due to its amplitude modulated nature and would not hold up well in the noisy channels often encountered on telephone lines and through radio frequency transmissions. Additionally, amplitude modulated systems do not tolerate magnetic tape dropouts, which are often encountered when slow scan video signals are stored for transmission or playback on audio tape equipment.

Yet another prior art technique for the simultaneous transmission of luminance and chrominance information is to amplitude modulate the already frequency modulated luminance subcarrier with the chrominance information much like that proposed for commercial AM radio stereo broadcasts. The defects in this technique as applied to slow scan television are similar to those of the previously discussed technique. In addition the opportunity for cross talk is significant. The fact that the amplitude modulated carrier frequency is shifting within the band in accordance with the frequency modulation together with the fact that the transmission channel is seldom linear in the band of interest results in an amplitude distortion generated by the frequency modulated component.

SUMMARY OF THE INVENTION

The present invention utilizes a technique of translating color slow scan video signals that enables such signals to be transmitted and received while using similar bandwidth and transmission time requirements as that of prior art monochrome slow scan video systems. The present invention also incorporates a desired feature of compatibility with existing monochrome slow scan television equipment.

The present invention utilizes the following techniques.

Three complementary color component slow scan video signals stored in a three-memory fast-to-slow scan converter, are read out in a picture element by picture element ("pixel") manner. Each set of three complementary color pixels is combined to provide a luminance information signal and two color difference signals that are representative of the chrominance information contained in the three complementary signals. The luminance signal is subtracted from one of the three complementary signals to provide a first color difference signal representative of a first portion (R-Y) of the chrominance information; and the luminance signal is subtracted from another of the three complementary signals to provide a second color difference signal representative of a second portion (B-Y) of the chrominance information. These color difference signals are encoded in accordance with the NTSC color transmission primary standards set forth by the National Television System Committee. The luminance information signal is frequency modulated within a first range in the slow scan video signal frequency band according to the current monochrome slow scan television standard. This standard describes the slow scan television signal as an audio frequency modulated system with white generating a 2300 Hz tone and black generating a 1500 Hz tone, with tones in between 1500 Hz and 2300 Hz representing various shades of gray. Line and frame synchronization pulses take the form of bursts of a 1200 Hz tone, with a short, approximately 5 msec burst for line sync and a longer burst of approximately one slow scan line in duration for frame sync. The first and second color difference signals are time-division-multiplexed at the slow scan video signal line rate to provide a chrominance information signal. The chrominance information signal is frequency modulated within a second frequency range in the slow scan video signal frequency band separate from the first frequency range; and is thereby combined with the frequency modulated luminance information signal to provide a composite color slow scan video signal for transmission.

The color difference signals are transmitted on a frequency modulated subcarrier of 700 Hz to provide alternating lines of "R-Y" and "B-Y" information. The frequency modulated chrominance information preferably deviates 100 Hz on either side of the 700 Hz carrier to provide a 600 Hz tone for minimal "B-Y" or "R-Y" information, and an 800 Hz tone for maximal "R-Y" or "B-Y" information. Intermediate tone values are generated between 600 Hz and 800 Hz. Both the "R-Y" and "B-Y" baseband information color difference signals are bandlimited to approximately one-half of the luminance information signal modulation rate to contain the chrominance information sidebands within the second frequency range. This has little effect on the received color image as it is well established in the art that the chrominance information signal can be substantially reduced in bandwidth due to the luminance/chrominance perception of the human eye. The alternating nature of the "R-Y" and "B-Y" information signals causes a similar reduction in chrominance resolution in the vertical direction due to the fact that two complete luminance information signals are transmitted in the time that one pair of R-Y and B-Y information color difference signals has been transmitted. This also results in one of the two color difference information signals being missing during the transmission of each line of the luminance information signal. This missing color difference signal preferably is replaced in the reception process by reusing the previously received corresponding color difference signal in place of the missing color difference signal. To minimize artifacts caused by this process, each transmitted color difference signal preferably is the average of consecutively provided color difference signals of the same character.

The R-Y and B-Y information color difference signals are identified upon transmission by frequency modulating the beginning of the first color difference signal portion (R-Y) of the chrominance information signal about a different frequency than the beginning of the second color difference portion (B-Y) of the chrominance information signal. During the line sync interval of the luminance information signal, the chrominance information signal carrier rests at 600 Hz thereby identifying the beginning of a line of the R-Y information color difference signal, which is then transmitted simultaneously with its luminance information signal counterpart. During the next line sync interval of the luminance information signal, the chrominance information signal carrier rests at 800 Hz thereby identifying the beginning of a line of the B-Y information color difference signal. The B-Y information color difference signal is then transmitted with its luminance information signal counterpart to complete the transmission of enough information to reconstruct two high quality color video signal lines. Upon reception, the complementary red, green and blue color primary signals are reconstructed from the received "Y", "R-Y" and "B-Y" information signals and are subsequently stored in a three-color memory slow-to-fast scan converter for display.

Monochrome compatibility is maintained by utilizing the present monochrome standards for transmission of the luminance information signal, which provides the monochrome component of the color image. A monochrome-only slow scan television receiver can receive the monochrome representation of a color image by merely suppressing the reception of the chrominance information signal. Likewise, the color slow scan television receiver can display a received monochrome picture by loading a received demodulated monochrome video signal into all three color scan converter memories.

Additional features of the present invention are described in relation to the description of the preferred embodiment.

DESCRIPTION OF THE PREFERRED EMBODIMENT

Figure 1:
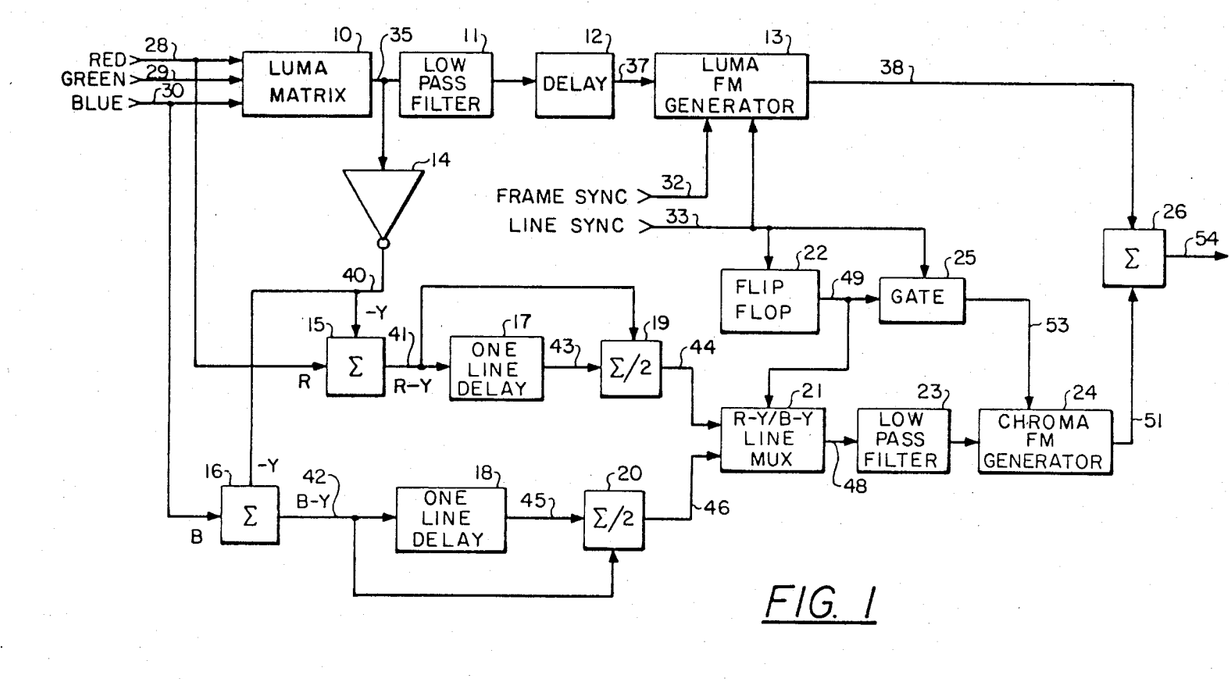
FIG. 1 is a block diagram of a color slow scan video signal transmitter for use in translating color slow scan video signals for transmission in accordance with the translation technique of the present invention.

Referring to FIG. 1, the preferred embodiment of a transmitter utilizing the color slow scan video signal translation technique of the present invention includes a luma matrix 10, a first low pass filter 11, a delay circuit 12, a luma FM generator 13, an inverter 14, a first summing circuit 15, a second summing circuit 16, a first one-line delay circuit 17, a second one-line delay circuit 18, a first averaging circuit 19, a second averaging circuit 20, a multiplexer 21, a flip-flop 22, a second low pass filter 23, a chroma FM generator 24, a gate 25 and a third summing circuit 26. Three complementary color component slow scan video signals are provided on lines 28, 29 and 30 to the luma matrix 10 from the three memories of a three-memory fast-to-slow scan converter (not shown). Frame sync and line sync signals are provided respectively on lines 32 and 33 to the luma FM generator 13 from the same scan converter as provides the complementary color component signals on lines 28, 29 and 30.

The luma matrix 10 provides a luminance information signal on line 35 that is bandlimited by the first low pass filter 11 and delayed by the delay circuit 12 prior to being provided on line 37 to the luma FM generator 13.

The delay unit 12 provides sufficient delay to compensate for the additional delay induced in the chrominance information channel by the second low pass filter 23 due to the inequality of the bandwidths at which the luminance information signal and chrominance information signal are frequency modulated respectively by the luma FM generator 13 and the chroma FM generator 24. The bandwidth of the luminance information is limited by the first low pass filter 11 to suppress the generation of interfering FM sidebands that could penetrate the chrominance information channel.

The luma FM generator 13 frequency modulates the delayed luminance information signal from line 37 within a first frequency range of 1100 Hz to 2700 Hz. The luma FM generator 13 also frequency modulates the line sync signal from line 33 and the frame sync signal from line 32 in order to provide a frequency modulated synchronized luminance information signal on line 38. The line sync signal is modulated as a short (5 msec) burst of a 1200 Hz tone; and the frame sync signal is modulated as a 1200 Hz tone of approximately one slow scan video signal line in duration.

The chrominance information signal is formed by combining and further processing the luminance information signal on line 35 with two of the three complementary color component slow scan video signals on lines 28-30. The luminance information signal on line 35 is inverted by the inverter 14 to provide an inverted luminance information signal on line 40. The summing circuit 15 sums the red component signal from line 28 with the inverted luminance information signal from line 40 to provide a first color difference signal on line 41 that is representative of the R-Y portion of the chrominance information. The summing circuit 16 sums the blue component signal from line 30 with the inverted luminance information signal from line 40 to provide a second color difference signal on line 42 that is representative of the B-Y portion of the chrominance information.

The first one-line delay circuit 17 delays the R-Y information color difference signal on line 41 by one slow scan video signal line to provide a delayed R-Y information color difference signal on line 43. The first averaging circuit 19 averages the R-Y information color difference signal from line 41 and the delayed R-Y information color difference signal from line 43 to provide an averaged R-Y information color difference signal on line 44.

The second one-line delay circuit 18 delays the B-Y information color difference signal on line 42 by one slow scan video signal line to provide a delayed B-Y information color difference signal on line 45. The second averaging circuit 20 averages the B-Y information color difference signal from line 42 and the delayed B-Y information color difference signal from line 45 to provide an averaged B-Y information color difference signal on line 46.

The multiplexer 21 multiplexes the respective R-Y and B-Y information color difference signals on lines 44 and 46 at the slow scan video signal line rate to provide a chrominance information signal on line 48. The multiplexer 21 is switched by a switching signal provided on line 49 by the flip-flop 22 in response to the line sync signal on line 33 from the three memory fast-to-slow scan converter (not shown).

The second low pass filter 23 limits the bandwidth of the chrominance information signal on line 48 in order to suppress the generation of interfering FM sidebands that could penetrate the luminance information channel.

The chroma FM generator 24 frequency modulates the chrominance information signal within a second frequency range of 400 Hz to 900 Hz to provide a frequency modulated chrominance information signal on line 51.

In order to separately identify the respective R-Y and B-Y information color difference signals in the frequency modulated composite video signal on line 51, the gate 25 provides a modulation control signal on line 53 in response to the switching signal on line 49 for causing the chroma FM generator to frequency modulate the chrominance information signal provided on line 51 about a frequency of 600 Hz at the beginning of each line of the R-Y information color difference signal included in the chrominance information signal provided on line 48 by the multiplexer 21, and about a frequency of 800 Hz at the beginning of each line of the B-Y information color difference signal included in the chrominance information signal on line 48. The gate 25 is enabled at the beginning of each line of R-Y or B-Y information by the line sync signal on line 33.

The third summing circuit 26 combines the frequency modulated synchronized luminance information signal on line 38 with the frequency modulated chrominance information signal on line 51 to provide a composite color slow scan video signal on line 54 for transmission.

Figure 2:
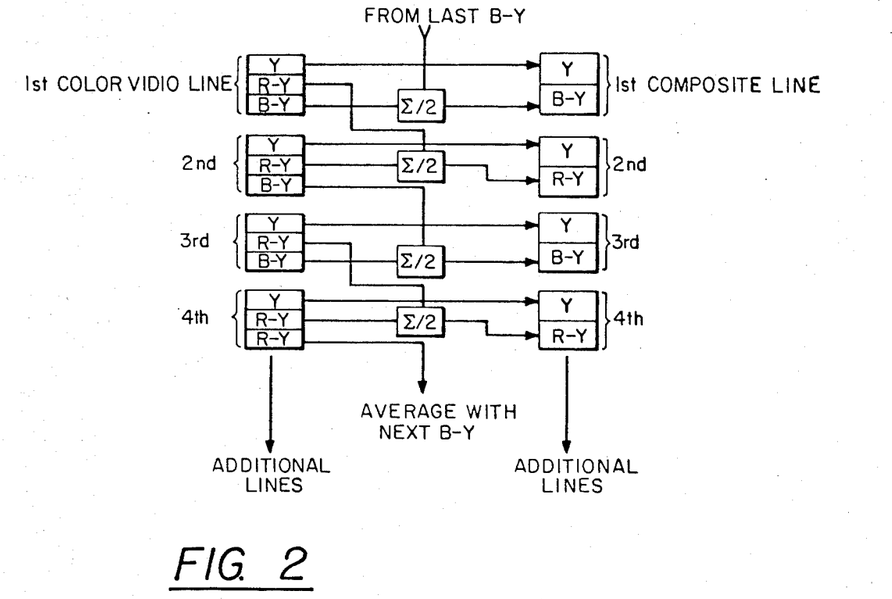
FIG. 2 illustrates the relationship between the components of the composite color slow scan video signal provided by the system of FIG. 1.

FIG. 2 illustrates how consecutive lines of the respective R-Y and B-Y information color difference signals are processed and interlaced within consecutive lines of the composite color slow scan video signal on line 54.

A luminance (Y) information signal and respective R-Y and B-Y information color difference signals are provided during each line of color video information represented by the three complementary color component slow scan video signals from the three memory fast-to-slow scan converter. The first line of the composite signal on line 54 includes the luminance (Y) information signal derived from the first line of color video information and the B-Y information color difference signal obtained by averaging the B-Y information color difference signals derived from the first line and the last preceeding line of color video information. The second line of the composite signal on line 54 includes the luminance (Y) information signal derived from the second line of color video information and the R-Y information color difference signal obtained by averaging the R-Y information color difference signals derived from the second and first lines of color video information. Succeeding lines of the composite color slow scan video signal on line 54 are formed in the same manner. The consecutive lines of the respective color difference signals are averaged to minimize the loss of chrominance information that would occur if alternate lines of one color difference signal were discarded when the other color difference signal was included in the composite color slow scan video signal on line 54.

Figure 3:
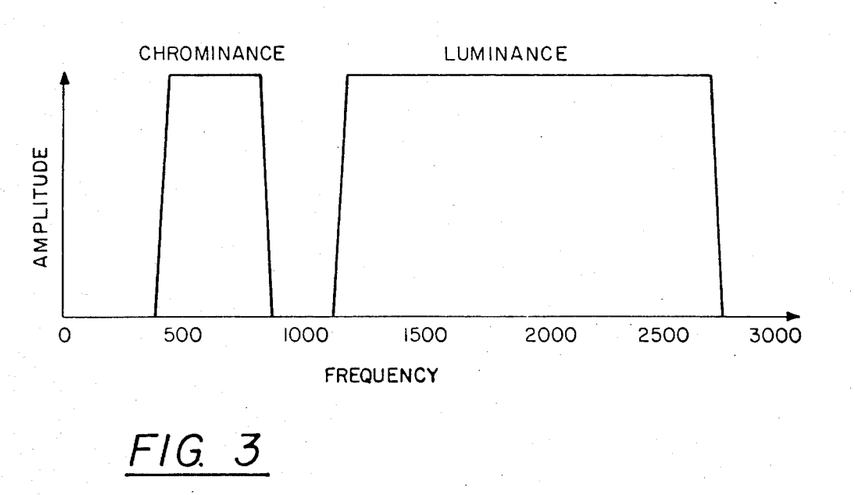
FIG. 3 shows the spectrum of the composite slow scan video signal translated for transmission by the system of FIG. 1.

The frequency spectrum of the composite color slow scan video signal on line 54 is illustrated in FIG. 3. The synchronized luminance information signal is frequency modulated within a first frequency range of from 1100 Hz to 2700 Hz. The chrominance information signal is frequency modulated within a second frequency range of from 400 Hz to 900 Hz.

Figure 4:
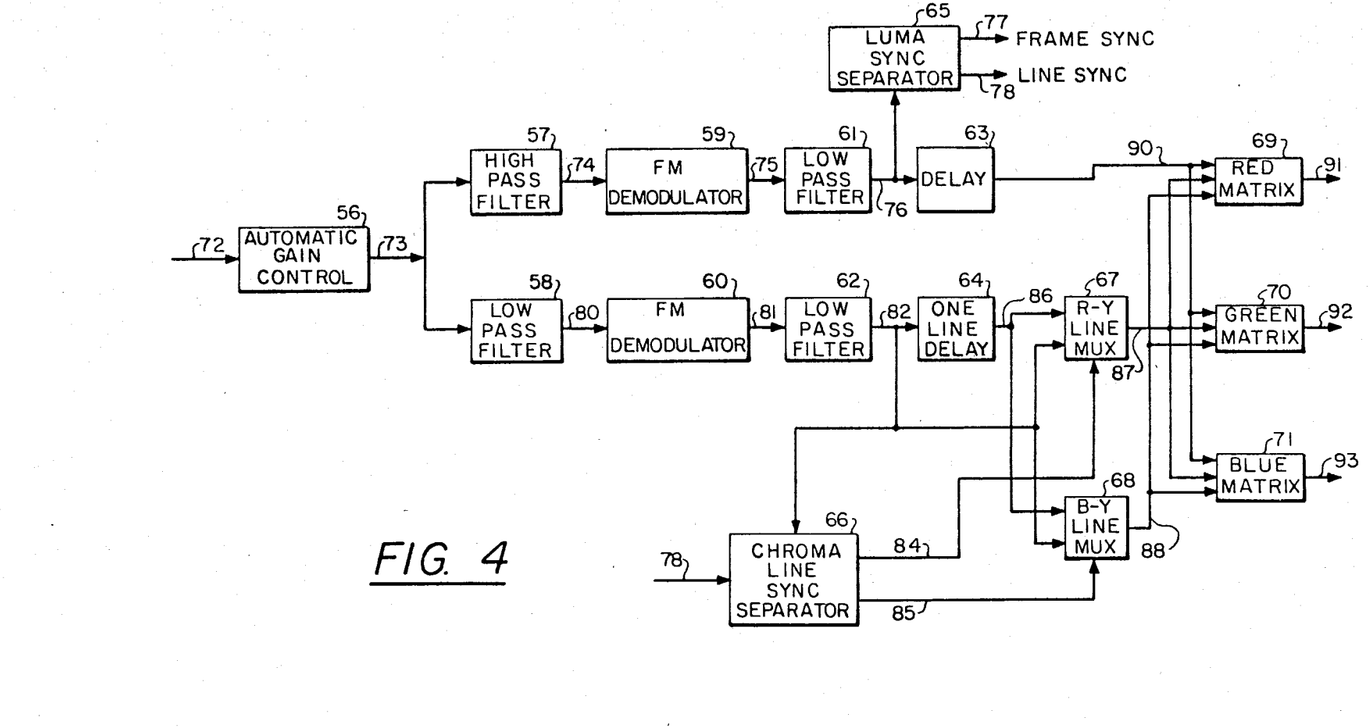
FIG. 4 is a block diagram of a color slow scan video signal receiver for use in translating color slow scan video signals received from the transmitter of FIG. 1.

A preferred embodiment of a slow scan video signal receiver for use in translating the color slow scan video signals received from the transmitter of FIG. 1 is described with reference to FIG. 4. The receiver includes an automatic gain control circuit 56, a high pass filter 57, a first low pass filter 58, first and second FM demodulators 59, 60, second and third low pass filters 61, 62, a delay circuit 63, a one-line delay circuit 64, a luma sync separator 65, a chroma line sync separator 66, first and second multiplexers 67, 68, a red matrix 69, a green matrix 70 and a blue matrix 71.

A composite color slow scan video signal transmitted by the transmitter of FIG. 1 is received on line 72. The automatic gain control circuit 56 limits the gain of the received signal on line 72 to provide a constant level signal on line 73 to the high pass filter 57 and the first low pass filter 58. The high pass filter 57 and the first low pass filter 58 separate the FM synchronized luminance information signal and the FM chrominance information signal from the received composite color slow video signal. The high pass filter has a cutoff frequency of 1100 Hz; and the first low pass filter has a cutoff frequency of 900 Hz.

The FM synchronized luminance information signal is provided from the high pass filter 57 on line 74 and demodulated by the first FM demodulator 59 to provide a retrieved luminance information signal on line 75 to the second low pass filter 61. The second low pass filter 61 provides a retrieved synchronized luminance information signal on line 76 that is restricted to only information contained in the luminance video signal band.

The luma sync separator 65 strips the synchronization signals from the retrieved synchronized luminance information signal on line 76 and provides a retrieved frame sync signal on line 77 and a retrieved line sync signal on line 78 to a three memory slow-to-fast scan converter (not shown) and to the chroma line sync separator 66.

The FM chrominance information signal is provided from the low pass filter 58 on line 80 and demodulated by the second FM demodulator 60 to provide a retrieved varying amplitude chrominance information signal on line 81 to the third low pass filter 62. The third low pass filter provides a retrieved chrominance information signal on line 82 that is restricted to only information contained in the chrominance video signal band.

The chroma line sync separator 66 responds to the respective amplitudes in the retrieved chrominance information signal on line 82 that correspond to the respective identifying beginning modulation frequencies of the color difference signals in the FM chrominance information signal in order to provide complementary first and second line synchronizing signals on lines 84 and 85 corresponding to the respective first and second color difference signals. The chroma line sync separator 66 looks for the amplitudes that identify the respective beginning modulation frequencies of the color difference signals during a window defined at the beginning of each slow scan video signal line by the sync signal from line 78.

The one-line delay circuit 64 delays the retrieved chrominance information signal on line 82 by one slow scan video signal line to provide a delayed chrominance information signal on line 86.

The first multiplexer 67 time-division-multiplexes the retrieved chrominance information signal on line 82 and the delayed chrominance information signal on line 86 at the slow scan video signal line rate to provide a retrieved R-Y information color difference signal on line 87 during each slow scan video signal line interval. The first multiplexer 67 is switched by the first line synchronizing signal on line 84.

The second multiplexer 68 time-division-multiplexes the retrieved chrominance information signal on line 82 and the delayed chrominance information signal on line 86 at the slow scan video signal line rate to provide a retrieved B-Y information color difference signal on line 88 during each slow scan video signal line interval. The second multiplexer 68 is switched by the second line synchronizing signal on line 85.

This process effectively fills in the missing respective R-Y and B-Y information color difference signals that are omitted when the respective color difference signals are interlaced to form the composite color slow scan video signal on line 54 (FIG. 1) for transmission.

The retrieved R-Y information color difference signal on line 87 and the retrieved B-Y information color difference signal on line 88 are provided to each of the red, green and blue matrices 69, 70 and 71 during each slow scan video signal line interval.

The luminance information signal on line 76 is delayed by the delay circuit 63 to compensate for the time delay differences between the second and third low pass filters 61 and 62 and is provided on line 90 to the red, green and blue matrices 69, 70, and 71 to arrive simultaneously with the corresponding color difference signals provided thereto on lines 87 and 88.

The respective red, green and blue matrices 69, 70 and 71 combine the retrieved first and second color difference signals on lines 87 and 88 with the retrieved luminance information signal on line 90 to provide three complementary color component slow scan video signals on lines 91, 92 and 93 to the three memory slow-to-fast scan converter (not shown).

I claim:

1. A system for translating into three complementary color component slow scan video signals, a composite color slow scan video signal containing a frequency modulated (FM) luminance information signal within a first frequency range of the slow scan video signal frequency band and an FM chrominance information signal within a separate second frequency range of the slow scan video signal frequency band, wherein the chrominance information signal includes a first color difference signal derived by subtracting the luminance information signal from one of three complementary color slow scan video signals and a second color difference signal derived by subtracting the luminance information signal from another of three complementary color slow scan video signals, said system comprising means for filtering the composite video signal to separate the FM luminance information signal from the FM chrominance information signal;

means for demodulating the FM luminance information signal to retrieve the luminance information signal;

means for demodulating the FM chrominance information signal to retrieve the chrominance information signal;

means for processing the retrieved chrominance information signal to separate and retrieve the first and second color difference signals; and means for combining the retrieved first and second color difference signals with the retrieved luminance information signal to provide three complementary color component slow scan video signals.

2. A system according to claim 1, for translating a said composite video signal that further includes FM frame and line synchronizing signals for the three complementary signals within the first frequency range, wherein the means for demodulating the FM luminance information signal are adapted for also demodulating the FM frame and line synchronizing signals to retrieve the frame and line synchronizing signals; and the system further comprises means for separating the retrieved frame and line synchronizing signals from the retrieved luminous information signal.

3. A system according to claim 1, wherein the means for processing the retrieved chrominance information signal includes means for delaying the retrieved chrominance information signal by one slow scan video signal line to provide a delayed chrominance information signal;

a first multiplexer for time-division-multiplexing the retrieved chrominance information signal and the delayed chrominance information signal at the slow scan video signal line rate to retrieve the first color difference signal during each slow scan video signal line interval; and a second multiplexer for time-division-multiplexing the retrieved chrominance information signal and the delayed chrominance information signal at the slow scan video signal line rate to retrieve the second color difference signal during each slow scan video signal line interval.

4. A system according to claim 3 for translating a said composite video signal in which the beginning of the first color difference signal portion of the chrominance information signal is frequency modulated about a different frequency than the beginning of the second color difference portion of the chrominance information signal in order to identify said respective color difference signal portions, the system further comprising means for processing the retrieved chrominance information signal to distinguish the respective color difference signals in accordance with their amplitudes corresponding to their respective identifying beginning modulation frequencies in order to provide complementary first and second line synchronizing signals corresponding to the respective first and second color difference signals;

means for switching the first demultiplexer in response to the first line synchronizing signal; and means for switching the second demultiplexer in response to the second line synchronizing signal.

5. A method of translating into three complementary color component slow scan video signals, a composite color slow scan video signal containing a frequency modulated (FM) luminance information signal within a first frequency range of the slow scan video signal frequency band and an FM chrominance information signal within a separate second frequency range of the slow scan video signal frequency band, wherein the chrominance information signal includes a first color difference signal derived by subtracting the luminance information signal from one of three complementary color slow scan video signals and a second color difference signal derived by subtracting the luminance information signal from another of three complementary color slow scan video signals, said method comprising the steps of (a) filtering the composite video signal to separate the FM luminance information signal from the FM chrominance information signal;

(b) demodulating the FM luminance information signal to retrieve the luminance information signal;

(c) demodulating the FM chrominance information signal to retrieve the chrominance information signal;

(d) processing the retrieved chrominance information signal to separate and retrieve the first and second color difference signals; and (e) combining the retrieved first and second color difference signals with the retrieved luminance information signal to provide three complementary color component slow scan video signals.

6. A method according to claim 5, for translating a said composite video signal that further includes FM frame and line synchronizing signals for the three complementary signals within the first frequency range, wherein step (b) comprises the step of (f) demodulating the FM frame and line synchronizing signals to retrieve the frame and line synchronizing signals; and the method further comprises the step of (g) separating the retrieved frame and line synchronizing signals from the retrieved luminous information signal.

7. A method according to claim 5, wherein step (d) includes the steps of (f) delaying the retrieved chrominance information signal by one slow scan video signal line to provide a delayed chrominance information signal;

(g) time-division-mutliplexing the retrieved chrominance information signal and the delayed chrominance information signal at the slow scan video signal line rate to retrieve the first color difference signal during each slow scan video signal line interval; and (h) time-division-multiplexing the retrieved chrominance information signal and the delayed chrominance information signal at the slow scan video signal line rate to retrieve the second color difference signal during each slow scan video signal line interval.

8. A method according to claim 7, for translating a said composite video signal in which the beginning of the first color difference signal portion of the chrominance information signal is frequency modulated about a different frequency than the beginning of the second color difference portion of the chrominance information signal in order to identify said respective color difference signal portions, the method further comprising the steps of (i) processing the retrieved chrominance information signal to distinguish the respective color difference signals in accordance with their amplitudes corresponding to their respective identifying beginning modulation frequencies in order to provide complementary first and second line synchronizing signals corresponding to the respective first and second color difference signals;

(j) switching between the retrieved and delayed signals in step (g) in response to the first line synchronizing signal; and (k) switching between the retrieved and delayed signals in step (h) in response to the second line synchronizing signal.

9. A system for translating three complementary color component slow scan video signals into a single composite color slow scan video signal incorporating the luminance and chrominance information contained in the three complementary signals, comprising means for combining the three complementary signals to provide a luminance information signal;

means for subtracting the luminance information signal from one of the three complementary signals to provide a first color difference signal representative of a first protion of the chrominance information;

means for subtracting the luminance information signal from another of the three complementary signals to provide a second color difference signal representative of a second portion of the chrominance information;

means for time-division-multiplexing the first and second color difference signals at the slow scan video signal line rate to provide a chrominance information signal;

means for frequency modulating the luminance information signal within a first frequency range in the slow scan video signal frequency band;

means for frequency modulating the chrominance information signal within a second frequency range in the slow scan video signal frequency band separate from the first frequency range; and means for combining the frequency modulating luminance information signal and the frequency modulated chrominance information signal to provide a composite color slow scan video signal;

wherein the means for frequency modulating the luminance information signal are further adapted for frequency modulating the frame and line synchronization signals of the three complementary signals within the first frequency range, whereby the frequency modulated synchronizing signals are included within the first frequency range portion of the composite slow scan video signal.

10. A system for translating three complementary color component slow scan video signals into a single composite color slow scan video signal incorporating the luminance and chrominance information contained in the three complementary signals, comprising means for combining the three complementary signals to provide a luminance information signal;

means for subtracting the luminance information signal from one of the three complementary signals to provide a first color difference signal representative of a first portion of the chrominance information;

means for subtracting the luminance information signal from another of the three complementary signals to provide a second color difference signal representative of a second portion of the chrominance information;

means for time-division-multiplexing the first and second color difference signals at the slow scan video signal line rate to provide a chrominance information signal;

means for frequency modulating the luminance information signal within a first frequency range in the slow scan video signal frequency band;

means for frequency modulating the chrominance information signal within a second frequency range in the slow scan video signal frequency band separate from the first frequency range;

means for combining the frequency modulated luminance information signal and the frequency modulated chrominance information signal to provide a composite color slow scan video signal;

means for delaying the first color difference signal by one slow scan video signal line to provide a delayed first color differnce signal;

means for averaging the first color difference signal and the delayed first color difference signal to provide the first color difference signal that is time-division-mulitplexed;

means for delaying the second color difference signal by one slow scan video line to provide a delayed second color difference signal; and means for averaging the second color difference signal and the delayed second color difference signal to provide the second color difference signal that is time-division-multiplexed.

11. A method of translating three complementary color component slow scan video signals into a single composite color slow scan video signal incorporating the luminance and chrominance information contained in the three complementary signals, comprising the steps of (a) combining the three complementary signals to provide a luminance information signal;

(b) subtracting the luminance information signal from one of the three complementary signals to provide a first color difference signal representative of a first portion of the chrominance information;

(c) subtracting the luminance information signal from another of the three complementary signals to provide a second color difference signal representative of a second portion of the chrominance information;

(d) time-division-multiplexing the first and second color difference signals at the slow scan video signal line rate to provide a chrominance information signal;

(e) frequency modulating the luminance information signal within a first frequency range in the slow scan video signal frequency band;

(f) frequency modulating the chrominance information signal within a second frequency range in the slow scan video signal frequency band separate from the first frequency range; and (g) combining the frequency modulated luminance information signal and the frequency modulated chrominance information signal to provide a composite color slow scan video signal;

wherein step (e) includes the step of (h) frequency modulating the frame and line synchronization signals of the three complementary signals within the first frequency range to include the frequency modulated synchronizing signals within the first frequency range portion of the composite slow scan video signal.

12. A method of translating three complementary color component slow scan video signals into a single composite color slow scan video signal incorporating the luminance and chrominance information contained in the three complementary signals, comprising the steps of (a) combining the three complementary signals to provide a luminance information signal;

(b) subtracting the luminance information signal from one of the three complementary signals to provide a first color difference signal representative of a first portion of the chrominance information;

(c) subtracting the luminance information signal from another of the three complementary signals to provide a second color difference signal representative of a second portion of the chrominance information;

(d) time-division-multiplexing the first and second color difference signals at the slow scan video signal line rate to provide a chrominance information signal;

(e) frequency modulating the luminance information signal within a first frequency range in the slow scan video signal frequency band;

(f) frequency modulating the chrominance information signal within a second frequency range in the slow scan video signal frequency band separate from the first frequency range;

(g) combining the frequency modulated luminance information signal and the frequency modulated chrominance information signal to provide a composite color slow scan video signal;

(h) delaying the first color difference signal by one slow scan video signal line to provide a delayed first color difference signal;

(i) averaging the first color difference signal and the delayed first color difference signal to provide the first color difference signal that is time-division-multiplexed;

(j) delaying the second color difference signal by one slow scan video signal line to provide a delayed second color difference signal; and (k) averaging the second color difference signal and the delayed second color difference signal to provide the second color difference signal that is time-division-multiplexed.

* * * * *